J. BRICKEN.
ADDING MACHINE.
APPLICATION FILED NOV. 17, 1916.
1,277,692.
Patented Sept. 3, 1918.
8 SHEETS—SHEET 1.
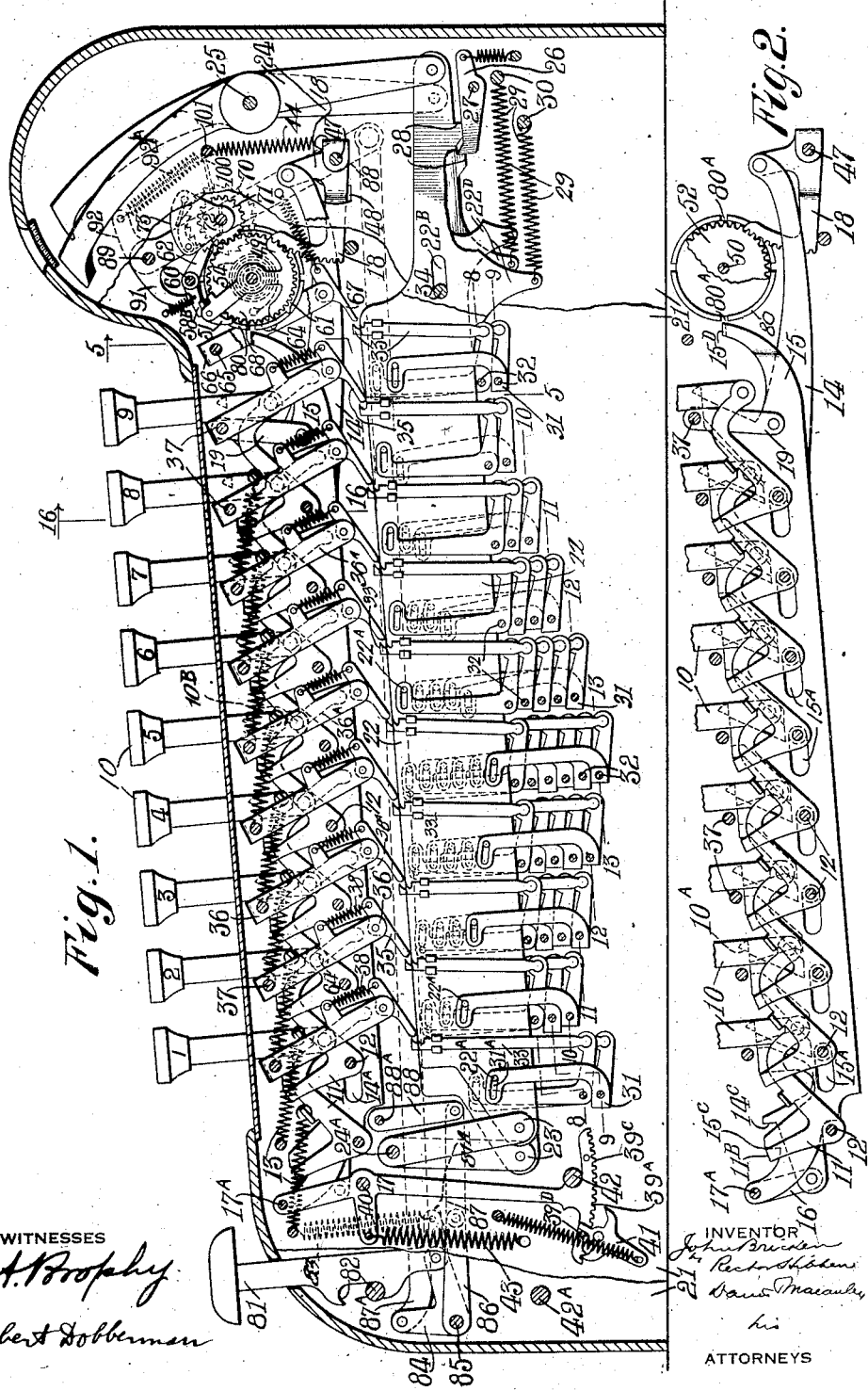
WITNESSES
INVENTOR
ATTORNEYS J. BRICKEN.
ADDING MACHINE.
APPLICATION FILED NOV. 17, 1916.
1,277,692.
Patented Sept. 3, 1918.
8 SHEETS—SHEET 2.
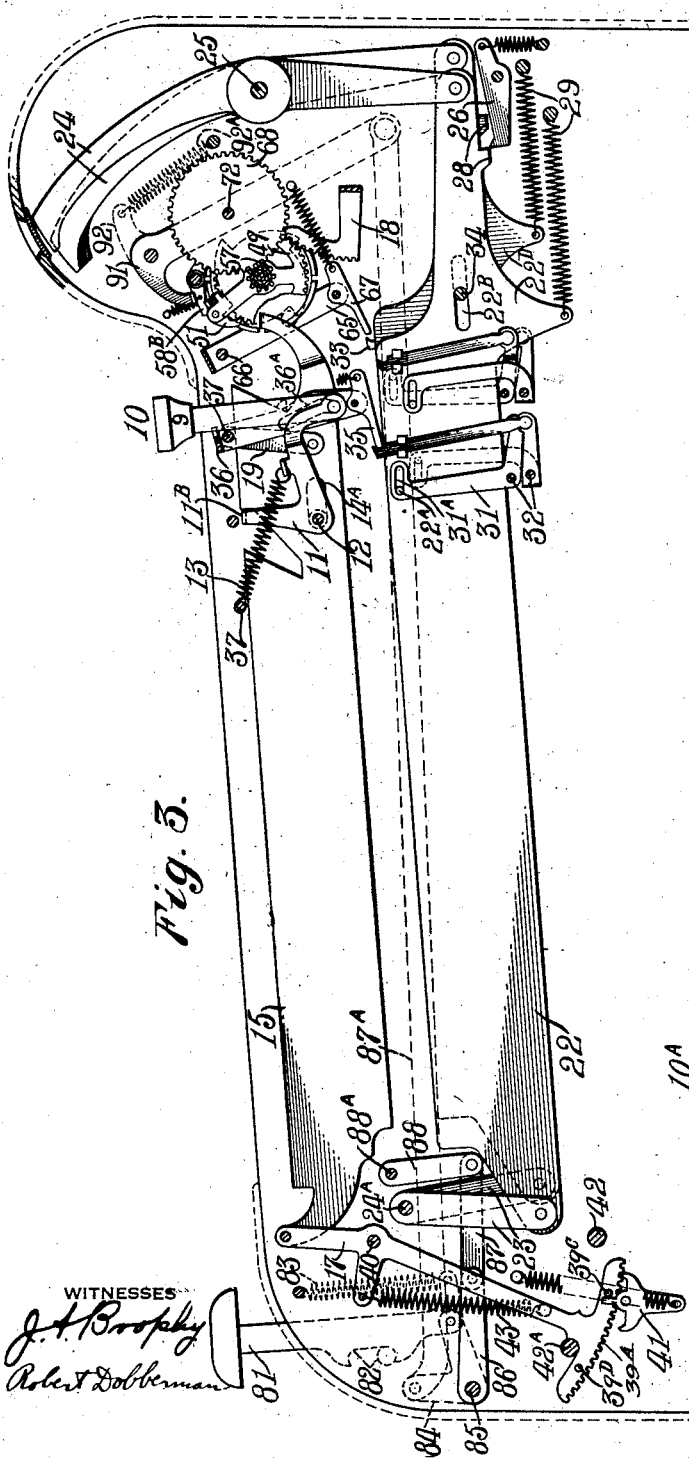
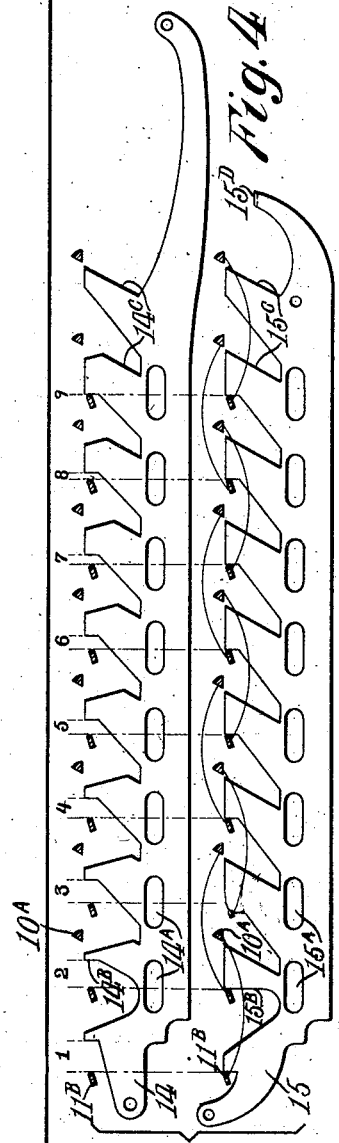
WITNESSES
INVENTOR
ATTORNEYS

J. BRICKEN.
ADDING MACHINE.
APPLICATION FILED NOV. 17, 1916.

1,277,692.

Patented Sept. 3, 1918.
8 SHEETS—SHEET 4.

WITNESSES
J. A. Brophy
Robert Dobberman

INVENTOR
John Bricken

ATTORNEYS

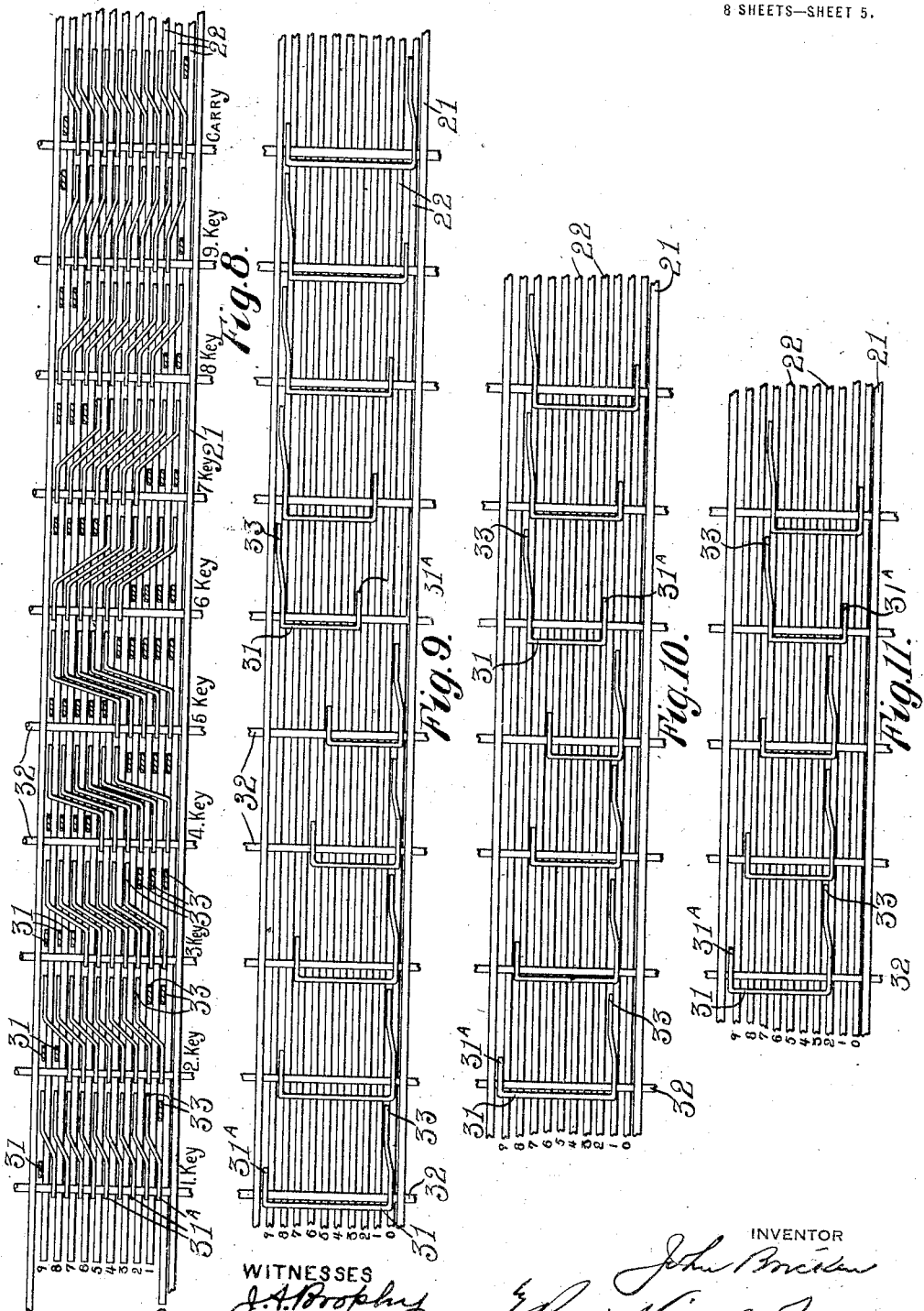

J. BRICKEN.
ADDING MACHINE.
APPLICATION FILED NOV. 17, 1916.

1,277,692.

Patented Sept. 3, 1918.
8 SHEETS—SHEET 6.

WITNESSES
J. A. Brophy
Robert Dobberman

INVENTOR
John Bricken

ATTORNEYS

J. BRICKEN.
ADDING MACHINE.
APPLICATION FILED NOV. 17, 1916.
1,277,692.
Patented Sept. 3, 1918.
8 SHEETS—SHEET 7.
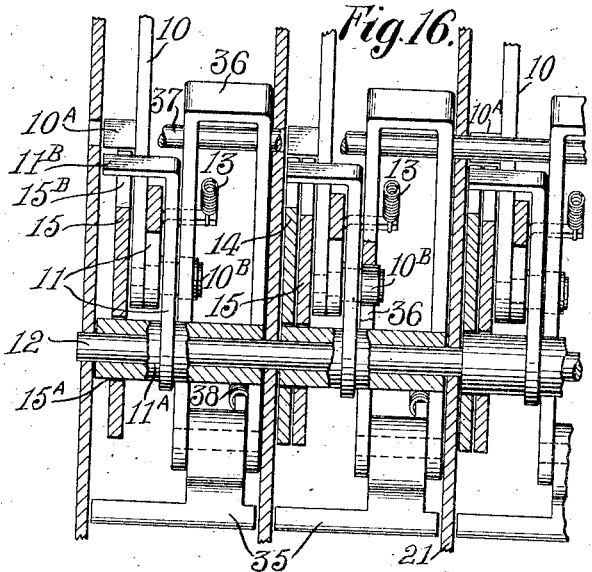
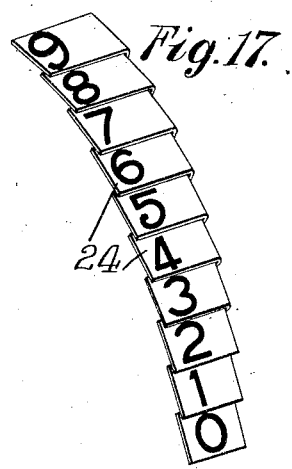
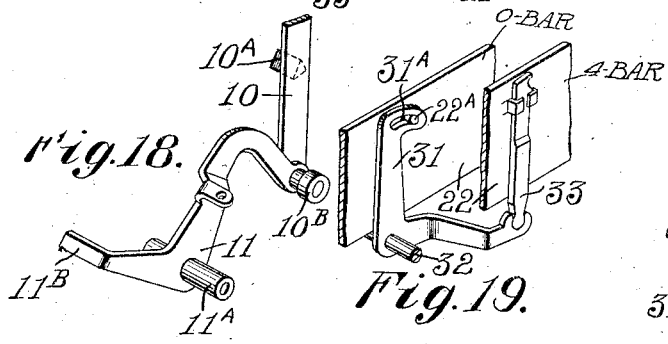
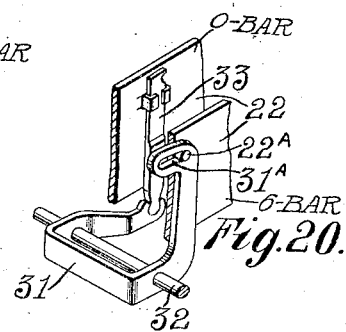
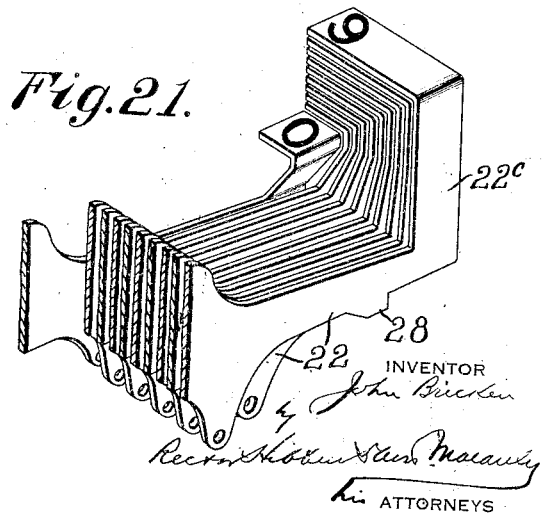
WITNESSES
J. A. Brophy
Robert Dobberman
INVENTOR
John Bricken
by
ATTORNEYS

J. BRICKEN.
ADDING MACHINE.
APPLICATION FILED NOV. 17, 1916.

1,277,692.

Patented Sept. 3, 1918.
8 SHEETS—SHEET 8.

Fig. 22.

INVENTOR
John Bricken
by Rector Hibben
Davis Macauley
his ATTORNEYS

UNITED STATES PATENT OFFICE.

JOHN BRICKEN, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,277,692.     Specification of Letters Patent.     Patented Sept. 3, 1918.

Application filed November 17, 1916. Serial No. 131,943.

*To all whom it may concern:*

Be it known that I, JOHN BRICKEN, a subject of the Emperor of Russia, residing at Detroit, in the county of Wayne and State of Michigan, have invented certain new and useful Improvements in Adding-Machines, of which the following is a specification.

The invention relates to an improved machine for adding and subtracting in which members, each having a numeral, from 0 to 9 inclusive, are substituted at the sight opening one for another, instead of the number being made to appear at the sight by the common form of numeral wheel having numbers disposed about its periphery. As here shown, registering levers have offset plates at their upper ends one above the other, the 0 plate being the lower one and 9 the upper. The lower ends of these levers are pivotally connected to actuator bars or plates of which there are ten for each order, one of which is always forward with its associated number appearing at the sight. Each of these actuator bars in all orders but units is provided with ten control pins, the pins on the forward bar controlling staggered bell crank levers which set up one of ten abutments on each of the other bars, said abutments when in raised or operating position, being in the path of a universal pawl, of which there is one for each numeral key, and an additional pawl for effecting the carry. Depression of a numeral key operates its pawl to engage the abutment in its path and push the selector bar to which it is attached, forward, and rock the associated lever to cause its number to appear at the sight. Simultaneously, the bar previously forward is released and returns to its rearmost position under spring tension to remove its numbers from the sight and permit the number of the now advanced bar to appear at the sight. A universal locking bar for each order, including units, locks the advanced bar in its forward position until a cam on the under side of the bar next advanced, rocks the universal lock bar to release the forward bar and permit it to return, and locks the advanced bar in forward position.

The staggered bell cranks are arranged on shafts in tiers under the selector bars in order to avoid interference with each other.

In order to understand the invention, it must be borne in mind that the pins and bell crank levers of the selector bar which is forward in all the orders, always control the setting up of one abutment on each bar in this order.

In the units order, the tenth or carrying bank is omitted; as there would be no carry into the units order from a lower order.

The abutments which have been projected into the path of the universal pawl by the bar which is forward, are controlled as follows:

The 0 bar being forward, its nine pins operate associated bell cranks to set up one abutment on each of the bars 1 to 9 inclusive.—

1st pin raises abutment for 1 key on 1 bar
2nd "   "      "      " 2 "   " 2 "
3rd "   "      "      " 3 "   " 3 "

and so on to the 9 pin inclusive. From this it will be seen that depression of any key— for example, to add four the 4 key being depressed, operates its universal foot to engage the abutment of the 4 bar to push that bar forward, which forward movement releases the 0 bar and permits it to return to its rearmost position to remove 0 from the sight and substitute 4. The 4 bar now being forward, its 1st pin raises abutment for 1 key on 5 bar
2nd "   "      "      " 2 "   " 6 "
3rd "   "      "      " 3 "   " 7 "

and so on to the ninth pin inclusive.

In every order but the unit there is an additional bank of bell crank levers, ten in each order corresponding in arrangement to the 1 key bank, for effecting a carry from the next lower order, the abutments in the carrying bank being pushed forward by similar universal feet which instead of being controlled by a key, are operated by a cam under control of a spring which is wound up by depression of the keys in the next lower order; and in going from 9 to 0 in a lower order, this spring is released and an additional 1 added into the higher order. It is to be understood that the selector bars of each order merely substitute one number at the sight for another, but depressing the keys winds up a spring in the next higher order a number of steps corresponding to the value of the key depressed; and as before stated, when going from 9 to 0 in any order, tripping mechanism will be released, and the spring unwound to add the necessary 1.

Referring to the drawings, Figure 1 is a sectional right side elevation with the spacing plates broken away to show the numeral bars of the first or units order, the selector mechanism of the tens order, and the zeroizing key.

Fig. 2 is a fragmentary detail view to more clearly illustrate the operation of the registering plate and the key locking plate.

Fig. 3 is a sectional side elevation of the last order showing the 9 key depressed with its selector bar forward and the numeral bar 9 at the sight.

Fig. 4 is a diagrammatic view illustrating the action of the keystems and bell cranks on the spring winding plates and key locking plates.

Fig. 8 is a horizontal section on the line 8—8 of Fig. 1 in bottom plan view.

Fig. 9 is a similar view on the line 9—9 of Fig. 1.

Fig. 10 is a similar view on the line 10—10 of Fig. 1.

Fig. 11 is a similar view on the line 11—11 of Fig. 1.

Figure 5:
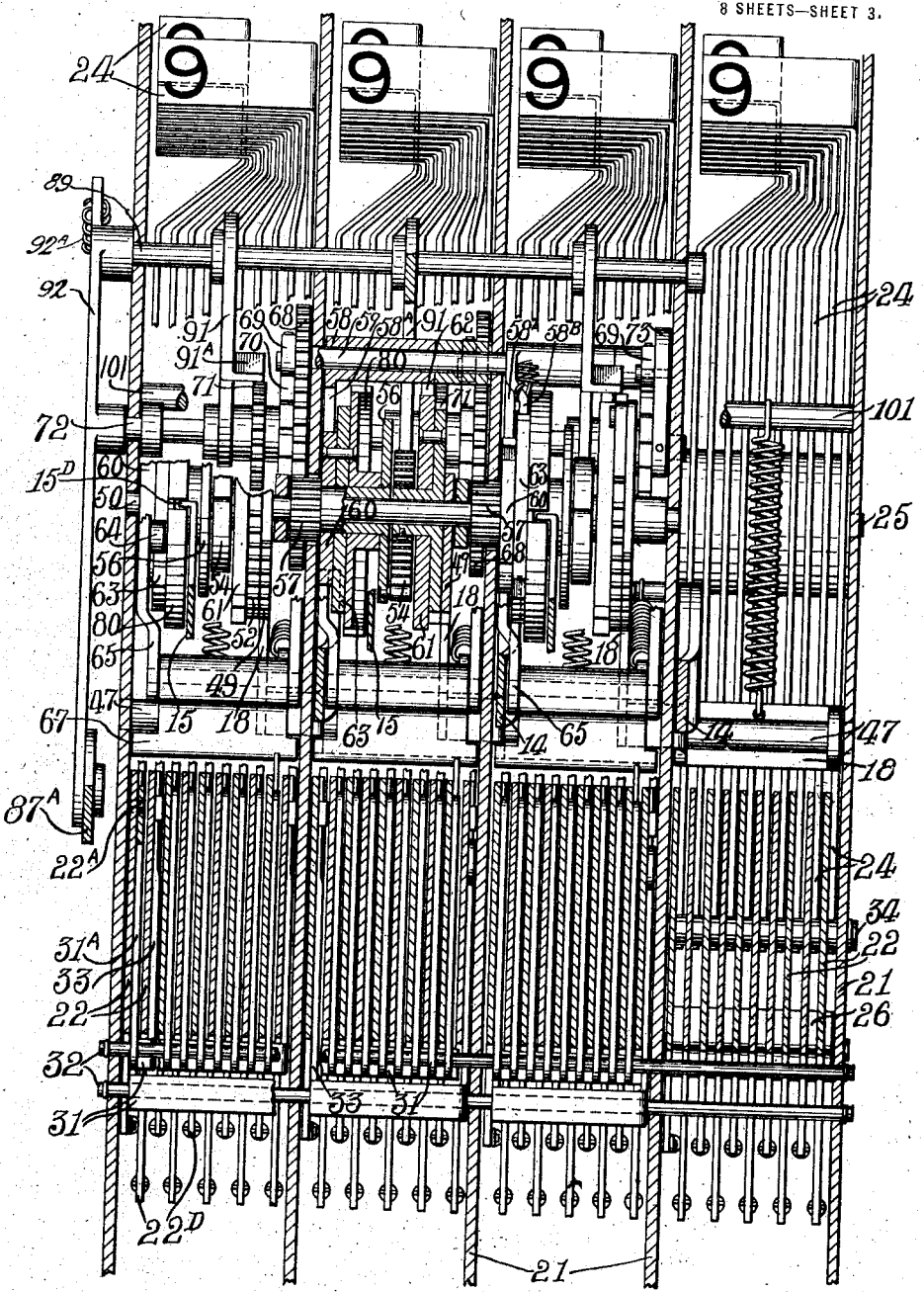
Fig. 5 is a vertical section on the line 5—5 of Fig. 1 with parts broken away to illustrate the connection between the spring winding mechanism and the carrying cam, and also shows the absence of the carrying bank of bell crank levers from the units order.

Fig. 16 is a detail vertical section on the line 16—16 of Fig. 1, showing the yoke members for operating the universal feet, and illustrating the absence of spring winding plate in the highest order, as in this order it is not necessary to wind up the springs of the next higher order and the key locking plate acts in this instance in the same capacity, in addition to holding up a carry when the 9 key is depressed.

Fig. 17 is a detail view showing the arrangement of the number plates, one above the other, opened out in fan like arrangement.

Fig. 18 is a detail perspective view of one of the actuating bell crank levers and keystems with the attached roller for operating the yoke arms.

Fig. 19 is a detail perspective view showing the pin on the 0 bar to operate its bell crank and lift the abutment on the 4 bar.

Fig. 20 is a detail perspective view showing the pin on the 6 bar engaging a bell crank which controls an abutment on the 0 bar so that when the 6 bar is moved forward, the abutment is raised into the path of the 4 key foot to add 4 and show 0.

Fig. 21 is a fragmentary perspective view of a modification of registering means which omit the levers.

Fig. 22 is a fragmentary perspective view of one group of selector bars or plates and a set or series of controlling devices, the plates themselves being broken away to better disclose these devices.

Referring to the drawings, 10 indicates the numeral keys of which there are nine in each order but the highest which has only the 9 key for adding the extra 9 in the last order to indicate the correct amount at the sight when subtracting. The numeral keys are pivotally connected to bell crank levers 11 pivoted on cross shafts 12 supported in the spacing plates. The free ends of bell cranks 11 have offset legs $11^B$ which engage the sides $14^B$ and $15^B$, Fig. 4, of cut out portions of the registering plate 14 and key locking plate 15 respectively, both of which are slotted at $14^A$ and $15^A$ respectively to permit rearward movement of same on spacing hub $11^A$ when the keys are depressed against the tension of restoring springs 13. As shown in Fig. 4, when a key is depressed, an offset lug $10^A$ on the keystem rides down alongside the incline spaces $14^C$ and $15^C$ of plates 14 and 15 to prevent overthrow of the same, and also acts to prevent depression of a second key in the same bank, for as soon as one key has started down, moving of the key locking plate 15 rearward, brings the top of said plates into the path of stud $10^A$ of all keys but the one depressed. Plate 15 always moves its full limit rearward by being acted upon by the offset legs $11^B$ when any key is depressed, but the spring winding plate 14 moves its full limit only when the 9 key is depressed. As shown in the top half of Fig. 4, there is lost motion between the legs $11^B$ and front faces $14^B$ of the registering plates, of an amount corresponding to the difference between value of the key depressed and 9. The plate 14 is connected at its forward end by a link 16 to a stud 17ᴬ on the upper end of full stroke lever 17, and at the rear, to one leg of a bell crank gear segment 18 which acts to store up a carry in the next higher order which will be described later. The key locking plate 15 is supported at its forward end on the same stud 17ᴬ and at the rear end by a link 19 hung from the cross shaft 37 supported in the spacing plates 21.

Arranged in vertical alinement beneath the plates 14 and 15 of each order are ten selector plates or bars 22 from 0 to 9 inclusive which co-act upon the depression of keys to substitute one number for another at the sight. These plates are supported at their front ends by links 23 hung from a cross shaft 24ᴬ and at the rear by the lower arms of numeral levers 24 pivoted on cross shaft 25 supported in the spacing plates and numbered from 0 to 9 inclusive beginning with 0 at the left, looking from the front. The upper ends of levers 24 form offset plates or tablets each having a number from 0 to 9, the 0 plate being on the bottom and 9 on top—Fig. 17. There is always one selector plate locked forward in advance of the others by a universal spring controlled dog 26 mounted on a cross shaft 27, the forward end of which is normally held in the path of a stop lug 28 on the lower edge of whichever bar 22 is advanced to prevent the return of same under tension of a spring 29 which connects the extensions 22ᴰ on the plates 22 with cross shaft 30, the extensions being alternately staggered for convenience in assembling the springs.

Arranged on the side of each plate 22 in all orders but the units and the highest order, there are ten pins 22ᴬ, nine controlled by the keys, and one for carrying from a lower order, the plates of the units order each having only nine pins, as there is no carry into the units order, and the plates or bars of the highest order requiring but two abutment pins. These pins engage slots 31ᴬ in the upstanding legs of bell crank levers 31 mounted on cross shafts 32 supported in the spacing plates beneath the selector bars 22, the other leg of the bell crank ending in a socket which holds an upwardly extending rod 33 mounted to slide up and down in guides on the side of whichever selector bar 22 is controlled by the pin and slot connection of the bell crank lever 31, the bell crank levers of the highest tier of shafts 32 being bent to straddle the gap between the selector bar operating the slotted end of bell crank 31, and the selector bar to which the associated rod 33 is attached, and the bell cranks on all the lower tiers being of yoke shaped construction for convenience in assembling, as shown in Figs. 8 to 13 inclusive.

As shown in Fig. 1, and more graphically in Fig. 22, the farthest selector bar to the left or the 0 bar, is shown in the forward or advanced position, all the remaining bars being in retracted position, the 0 bar being locked forward by the universal dog 26. The 0 bar being forward, the first nine pins on said bar operate the slotted ends of the bell crank levers 31 forward and lift the other ends to raise the upper ends of the rods 33 above the top of the selector bars from 1 to 9 inclusive. That is, the 0 bar being forward, the first pin on the 0 bar raises the first rod 33 on the 1 bar to be operated by the 1 key. The second pin on the 0 bar raises the rod 33 on the 2 bar. The third pin on the 0 bar raises rod 33 on 3 bar, etc. The 9 pin on the 0 bar raises the rod 33 on the 9 bar to be engaged by depression of the 9 key. As an example, the 0 bar being forward, the 1 key is depressed, and a pawl 35 on a yoke shaped member 36 is operated to engage the upper end of the rod 33 on the 1 bar and push the 1 bar forward, depression of the 2 key would have pushed the 2 bar forward, the 3 key the 3 bar, and so on to 9. The 1 bar or any other bar moving forward, rocks the dog 26 by its cam 28 in moving forward, and releases the bar 22 which had previously been advanced and permits same to return to retracted position under tension of a spring 29, and the bar which had later been moved forward is locked in the forward position by the front end of pawl 26 engaging back of the cam 28. This forward and rearward movement of the bar 22 rocks its numeral lever 24 about the pivot 25, so that the bar which has been pushed forward substitutes a numeral at the sight corresponding to the bar which has moved forward and retracts the numeral which had previously been at the sight. In all the orders but units there is an additional bank of bell crank levers 31 which are used for effecting a carry from the lower orders, this bank of bell crank levers being identical in arrangement with the bank of bell cranks operated by the 1 key, so that operation of the carry control from a lower order to a higher order substitutes a numeral at the sight one number higher than that previously appearing.

The last or highest order differs from the lower orders in that all the keys but the 9 key are omitted, the 9 key being only used for adding an additional 9 when performing subtraction to cause the proper numeral to appear at the sight when performing subtraction by the complemental process which is well known in the art of adding machines. In the units bank, as before stated, the carrying bank of bell cranks is omitted, as a carry never takes place from a lower order to the units order.

In order to push the selector bars 22 forward to change the numerals at the sight, the keystem pins are provided with roller studs 10$^B$ which engage cam slots 36$^A$ in yoke shaped arms 36 pivoted on cross shaft 37. Depression of a key 10 causes these roller studs 10$^B$ to rock the yoke shaped levers forward to bring pawl 35 mounted between the side arms of the yoke 36, into contact with the projecting tops of the rods 33 to push the associated selector rod 22 forward to its advanced position with its number at the sight and allow the previously advanced selector rod to return to its retracted position, the pawls 35 being flexibly mounted by a spring connection 38, so that when the depressed key is being restored, the forward end of the foot 35 will ride over the top of the projecting rod 33 which is in its path, it being understood that there is always one rod 33 projecting above the top of the selector bar for each numeral key in a bank. To safeguard against a key being only partly depressed and insure of its being depressed the full limit, a full stroke mechanism is arranged in each order consisting of the lever 17 pivoted on the shaft 40 and having at the lower edge a ratchet segment 39$^A$ engaged by a spring pressed double acting pawl 41 which is acted upon in such a way by pins 39$^C$ and 39$^D$ on the lever 17 as to insure of the segment traveling its full limit in either direction between the stops 42 and 42$^A$. A spring 43 tends to return the key locking bar 15 to its initial position after depression of a key, the forward end of the said key locking bar being connected to a stud on the upper end of the lever 17, the registering lever 14 being returned to normal position under tension of a spring 44 which acts on the carrying-gear segment 18 to which the rear end of the registering plate 14 is pivoted.

*Carrying mechanism.*—As before stated, forward movement of the selector bars 22 substitutes one numeral for another at the sight; and when the sum of a series of additions in any one order exceeds 9, the carrying mechanism is brought into play in all orders but the units order, as follows:

Beginning with the units order, when a key is depressed, a bell crank lever 11 moves a plate 14 rearward to rock a yoke shaped spring returned segmental rack 18 about the shaft 47, and at the same time, one of the pawls 35 pushes forward the selector bar whose rod 33 is in the path of said foot, to substitute a number at the sight in the units order corresponding to the sum of the additions in that order. The forwardly extending leg of gear segment 18 is offset to the left to project through a slotted opening 48 in the spacing plate and mesh with the gear segment 49 loosely mounted on a cross shaft 50 supported in the spacing plates. On depressing a key the segment 49 is rotated an amount corresponding to the value of the key depressed, and the dog 51 held in engagement with the gear 52 by a spring 53, rotates the 40-tooth gear 52 of the next higher order a corresponding amount to wind up a spring 54 in that order, one end of which is fast on the hub 52$^A$ of the gear 52, the free end being held on a stud 55 of an adjacent plate 56 fast on the hub 57$^A$ of a 10-tooth carrying gear 57 which is normally held from rotating in a counter clockwise direction by one leg 58$^A$ of an escapement pawl 58, Fig. 15, loose on shaft 59, which leg engages one tooth of a 4-tooth ratchet 60 fast on hub 57$^A$ to restrain movement of same until one of four trip cams 61$^A$ on the periphery of a circular disk 61 engages the nose 62$^A$ of an arm 62 fast on the escapement hub, and rocks the escapement arm 58$^A$ out of engagement with the ratchet 60 and moves the other leg 58$^B$ inward in the path of one of four cams 63$^A$ on the periphery of a carrying disk 63 fast on said hub 57$^A$. The free end of spring 54 being released, the disk 56, ratchet 60 and cam disk 63 move in a counter clockwise direction a quarter revolution, when the escapement pawl 58$^A$ will have been moved into the path of the next following tooth by the leg 58$^B$ being moved outward on the periphery of cam 63$^A$. The nose 62$^A$ will now have assumed the Fig. 15 position back of the cam 61$^A$ or the 0 position, while a cam 63$^A$ in its quarter revolution will have acted on a roller stud 64 on one leg of a yoke shaped carrying lever 65 pivoted on the cross shaft 66 to push its pawl 67 forward, and consequently the selector bar 22 whose upstanding rod 33 is in the path of said foot to substitute a numeral at the sight in the tens order, one unit higher than that previously showing.

Figure 6:
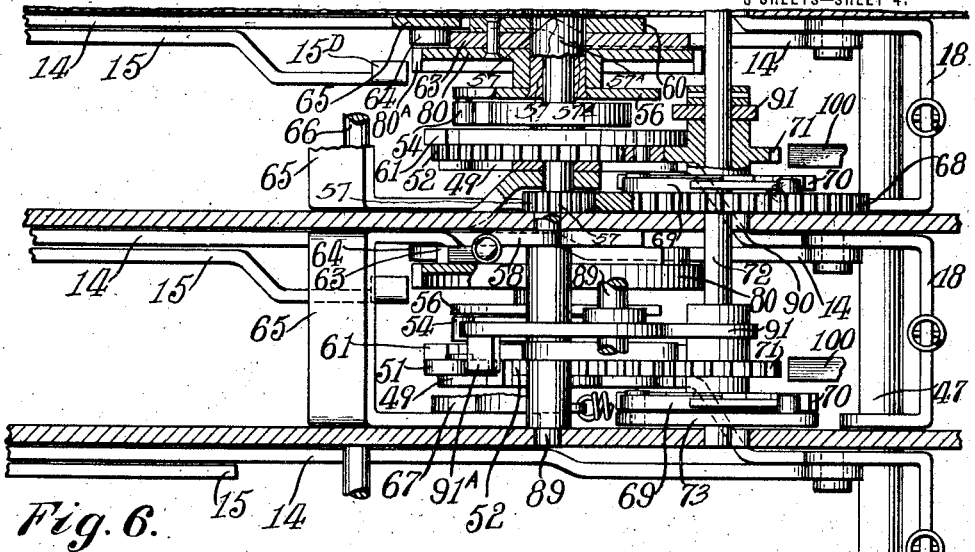
Fig. 6 is a sectional plan view of the units, tens and hundreds order of the carrying mechanism.
Figure 7:
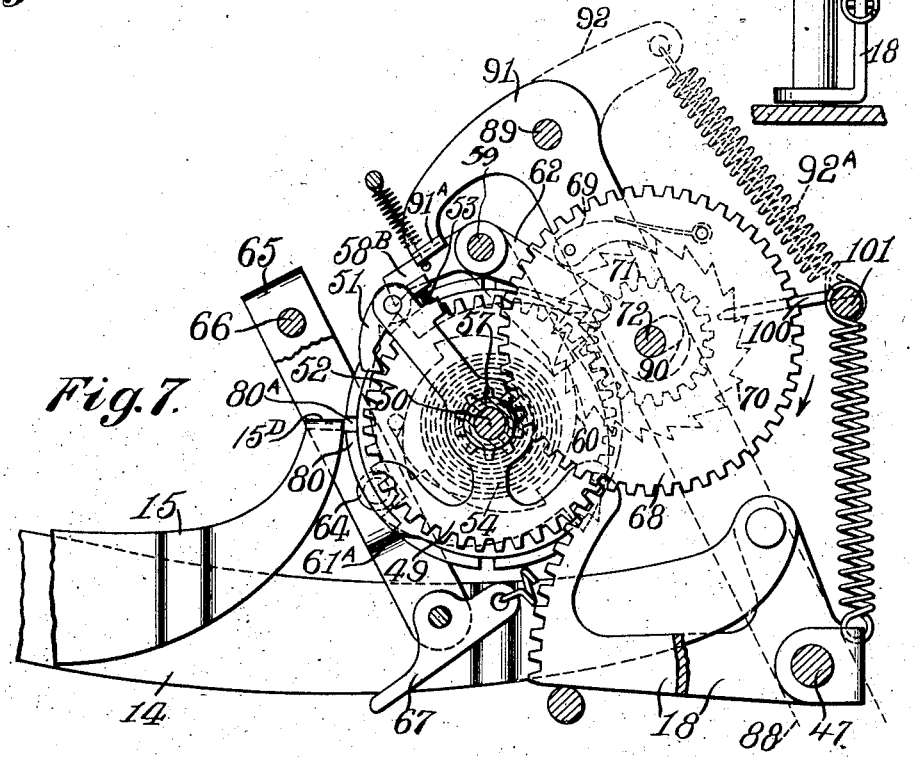
Fig. 7 is a detail sectional side elevation of the carrying mechanism illustrated in Fig. 6 and showing the parts in normal position.
Figure 12:
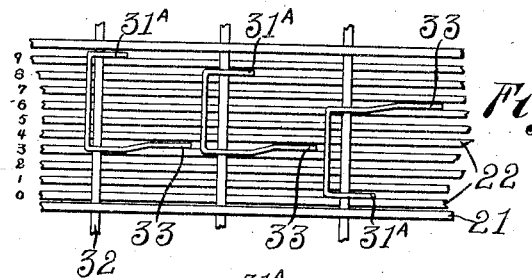
Fig. 12 is a similar view on the line 12—12 of Fig. 1.
Figure 13:
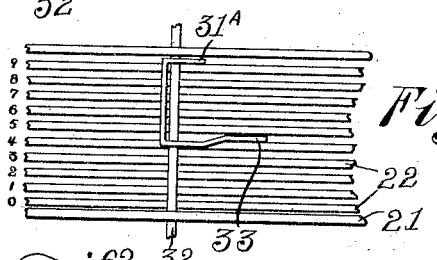
Fig. 13 is a similar view on the line 13—13 of Fig. 1.

The parts 56, 63, and 60 of the tens order being fast on hub 57$^A$ of the 10-tooth carrying gear 57 impart a corresponding rotation to said gear which is in mesh with a 50-tooth gear 68 in the hundreds order to rotate gear 68 $\frac{1}{20}$ of a revolution in the direction of the arrow, Fig. 7. A spring pressed pawl 69 fast on the side of gear 68 engages a 20-tooth ratchet 70 fast on the hub of a 20-tooth gear 71, meshing with the 40-tooth gear 52 of the same order and advances same with the cam disk 61 fastened thereto, a one-step movement at the same time winding up the spring a corresponding amount. The pawl 69 and ratchet 70 act to prevent unwinding of the spring 54. It will be noticed in the tens order that a pawl carrying plate 73 (see Figs. 1, 5 and 6) rigid on the shaft 72, is substituted for the gear 68 of the higher orders, the pawl 69 of the tens order acting as an anchor to prevent unwinding of all the springs of the higher orders which would occur if the anchor pawl 69 were removed.

The springs for storing up a carry are placed in the machine in a sufficiently wound condition so that the tendency of the spring in the hundreds order to rotate the gear 68 in a reverse or counter clockwise direction is overcome by the spring in the tens order. In other words, the gear 68 of the hundreds order is held from counter clockwise movement by the spring of the tens order, while the spring of the tens order is prevented from unwinding by the pawl 69 of the tens order. Again, if a carry were intended to take place from the tens order to the hundreds order, the spring in the tens order would be still further wound, and the tendency to unwind from the hundreds order would be overcome by the greater leverage of the carrying gear 57 to turn the gear 68, overcoming the leverage of the larger gear 68 to turn the smaller gear 57, irrespective of the amount the spring of the higher order had been wound up.

To avoid interference with the sequence of operations, it is necessary to provide means for holding up a carry until a numeral key has been fully depressed, otherwise a pawl 35 of the numeral key and pawl 67 of the carrying yoke would both tend to operate at the same time, and would result in an erroneous registration and push forward two selector bars. To avoid this, a disk 80 is fastened on the hub 57$^A$ of the carrying gear 57 between the disk 56 and the carrying disk 63, said disk 80 having a flanged periphery with cut-out portions 80$^A$, positioned 90 degrees apart, one of these cut-out portions of the flange being normally in horizontal alinement with an offset lug 15$^D$ of the key locking plate 15 and immediately adjacent thereto. To prevent interference of the registering and carrying mechanism, the initial downward movement of the keys moves the plate 15 rearward with its offset lug 15$^D$ into one of the cut-out portions 80$^A$ to block rotation of the disk 80 and the associated carrying mechanism until the key has been fully depressed and a selector bar pushed forward, and with the previously advanced selector bar returned to retracted position, which return movement of the previously advanced bar restores the rod 33 on the bar last advanced to lowered position, this by the action of the pin 22$^A$ returning the slotted end of the bell crank lever 31 to normal position with the upper edge of its associated lever 33 lowered out of engagement with its operating foot 35.

Figures 14, 15:
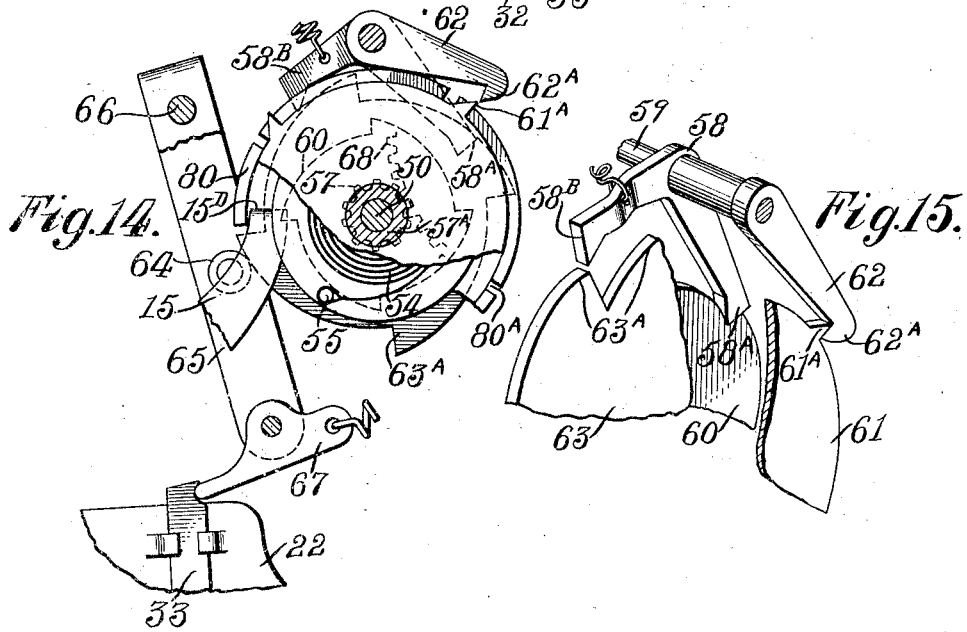
Fig. 14 is a detail view of the carrying mechanism just at the point of effecting a carry in going from 9 to 0 showing the carrying spring almost at the point of completing a carry, the escapement mechanism not having been returned to locking position.
Fig. 15 is a detail view showing the action of the carrying and trip pawls on the escapement and carrying cams and the trip lever.

When a key has been fully depressed, the lug 15$^D$ will have moved beyond locking engagement with the disk 80, and taken a position shown in Fig. 14 back of the flange to release disk 80 and permit a carry to the next higher order.

A clearer understanding of the operation of the machine may be had by describing a specific example; as for instance, to add 971 to 785, the "7" selector plate of the hundreds order, the "8" plate of the tens order, and "5" plate of the units order would be forward with their corresponding numbers appearing at the sight. Pins 22$^A$ on the "7" plate rock the associated slotted arms of the bell cranks 31 to lift the first abutment 33 on the "8" plate into the path of the "1" key, the second abutment on the "9" plate into the path of the "2" key, the third abutment on the "0" plate into the path of the "3" key, the fourth abutment on the "1" plate into the path of the "4" key, the fifth abutment on the "2" plate into the path of the "5" key, the sixth abutment on the third plate into the path of the "6" key, the seventh abutment on the fourth plate into the path of the "7" key, the eighth abutment on the fifth plate into the path of the "8" key, the ninth abutment on the sixth plate into the path of the "9" key, and the tenth or carrying abutment on the eighth plate into the path of the carrying pawl 67. The "8" selector plate of the tens order being forward, the pins 22$^A$ on that plate would rock the slotted arms of the associated bell crank levers to lift the first abutment on the "9" plate into the path of the "1" key, the second abutment on the "0" plate into the path of the "2" key, the third abutment on the "1" plate into the path of the "3" key, the fourth abutment on the "2" plate into the path of the "4" key, the fifth abutment on the "3" plate into the path of the "5" key, the sixth abutment on the "4" plate into the path of the "6" key, the seventh abutment on the "5" plate into the path of the "7" key, the eighth abutment on the "6" plate into the path of the "8" key, the ninth abutment on the "7" plate into the path of the "9" key, and the tenth or carrying abutment on the "8" plate into the path of the pawl 67. The plate 5 of the units order being forward, the pins 22$^A$ on that plate rock the slotted arms of the bell cranks 31 to lift the first abutment on the "6" plate into the path of the "1" key, the second abutment on the "7" plate into the path of the "2" key, the third abutment on the "8" plate into the path of the "3" key, the fourth abutment on the "9" plate into the path of the "4" key, the fifth abutment on the "0" plate into the path of the "5" key, the sixth abutment on the "1" plate into the path of the "6" key, the seventh abutment on the "2" plate into the path of the "7" key, the eighth abutment on the "3" plate into the path of the "8" key, the ninth abutment on the "4" plate into the path of the "9" key. There are no carrying abutments associated with the units bank, as no carry takes place into the units order.

At this time the carrying spring 54 of the tens order will have been wound up five points, the carrying spring of the hundreds order eight points, and the spring of the thousands order seven points, as depression of keys in any order winds up the spring of the next higher order a number of points corresponding to the value of the key depressed. The total number of points said spring is wound corresponds to the value of the plate which is forward in the next lower order, or the number at the sight in that order.

To add 971, depression of the "1" key 10 in the units order rocks its bell crank 11 about its shaft 12 to bring the offset lug 11B into contact with the front face 14B of plate 14 to move said plate rearward one step and rock the gear segment 18 meshing with the segment 49 of the tens order to wind up the spring of that order one additional point by the pawl 51 and gear 52, it being understood that the inner end of spring 54 is fastened to the hub 52A of gear 52, and turns therewith while the free end of the spring 54 is locked against rotation by the escapement pawl 58A engaging the tooth of the disk 60 of which the disk 56 to which the free end of the spring is fastened, is an integral part. Simultaneously with the depression of the "1" key, its roller stud 10B moves downward in the cam slot 36A of the yoke shaped pawl carrying arm 36, and moves the associated pawl 35 forward to engage the first abutment on the "6" selector plate and advance said plate to its forward position and substitute "6" at the sight for "5" previously shown. On the forward movement of the "6" plate its cam 28 rocked the universal latch 27 to release the "5" plate which returned to retracted position under tension of its spring 29, and the point of the pawl 27 returned under spring tension to a position back of cam 28 of the "6" plate to lock same forward.

Depressing the "7" key of the tens order operates a similar set of connections and rocks its pawl 35 forward which engages the seventh abutment 33 on the "5" plate to move it forward and permit the "8" plate previously forward to return to retracted position, thus substituting 5 at the sight in the tens order. As the carrying spring in the hundreds order was previously wound up eight points, adding seven in the tens order winds up the spring in the hundreds order an additional seven points, but ten points is the maximum any spring may be wound, consequently when the lift cams 61A of disk 61 of the hundreds order are being advanced from the 9 to the 0 position by the winding of the spring, said cam 61A lifts the arm 62 to free the escapement pawl 58A from engagement with escapement disk 60 and permit the free end of spring 54 to unwind a quarter revolution in a counter clockwise direction until again retarded by the escapement pawl 58A which has been restored to engaging position by the leg 58B being rocked outward radially by a cam 63A of disk 63 in the counter clockwise movement.

When the ratchet 60 was released by the escapement pawl 58A, counter clockwise movement was imparted to the carrying gear 57 which extends into the thousands order and is integral with the ratchet 60, said gear rotating the loose gear 68 of the thousands order sufficiently to cause the pawl 69 to turn the ratchet 70 and its attached pinion 71 an amount sufficient to rotate the gear 52 and wind the spring of the thousands order 1 point. Also to effect a carry from the tens to the hundreds order, it was necessary to substitute the numeral 8 or 7 in the hundreds order. This was accomplished by the cam 63A on the disk 63 engaging the roller 64 of the yoke shaped arm 65 in the hundreds order and rocking same with the pawl 67 to engage the carrying abutment 33 on the "8" plate of the hundreds order, and advance said plate to its forward position, the "7" plate returning to retracted position, as before described, 856 now appears at the sight, the sum of 785 and 71 being 856.

In a similar sequence of operations, depression of the "9" key in the hundreds order causes its pawl 35 to engage the ninth abutment 33 on the "7" plate to substitute it for the "8" plate previously forwarded, and at the same time, a carry is effected into the thousands order by the carrying pawl 67 engaging the tenth or carrying abutment 33 on "1" plate of the thousands order to advance same and retract the "0" plate and show 1756 at the sight, the sum of 785 and 971.

The above example illustrates the addition of 971 to 785 by depressing one key at a time beginning with the units order, but should an operator depress all the keys at one time, the keys of the higher orders would hold up the carry until the keys were fully depressed in order to substitute one plate for another before the carrying operation takes place, thus preventing an erroneous registration.

*Zeroizing mechanism.*—To restore all the orders to zero, a special key 81 is provided at the front left side of the machine between the last spacing plate and the machine cover, such key being limited in movement by a pin and slot connection 82, and restored to normal raised position by a spring 83 connected to an offset leg 81A of the keystem 81. The lower end of keystem 81 is pivoted to one leg of a bell crank lever 84 fast on a cross shaft 85, having fast thereto a lever 86 connected by a link 87 to a depending link 88 secured to a shaft 88A. Said link is in vertical alinement with the supporting link 23 of the 0 bar of the highest order, and there is a similar link or arm secured to the shaft for the 0 bar of all other orders. From this it will be seen that depression of the key 81 will draw the links 88 forward to engage links 23 of the 0 selector bars and pull same forward to substitute 0 at the sight in place of the previously appearing numbers.

The carrying mechanism must also be restored to zero position with the springs unwound, and to accomplish this, the upstanding arm of the bell crank 84 is connected by a link 87$^A$ to the lower end of a rocker arm 92 pinned to the cross shaft 89 and having a boss midway of its length embracing the shaft 72. Depression of the zeroizing key 81 rocks the shaft 72 rearward in the slots 90 of the spacing plates, to unmesh the gears on shaft 72 from the gears on shaft 50 and permit reverse movement of said gears to unwind the springs and eliminate any stored up carry which may be in same, thus bringing all the mechanism to normal zero position. To release the pawls 51 from gears 52, there are disposed along the shafts 89 and 72 rocking bell crank levers 91 having offset lugs 91$^A$, which, when levers 91 are rocked with the shaft 72, engage rearwardly extending projections of the pawls 51 to rock same out of engagement with the gears 52. A spring 92$^A$ connected to an offset leg of rock arm 92, assists the spring 83 to return lever 81 and restore the gears on shaft 72 to meshing engagement with the gears of shaft 50.

Overthrow of the carrying mechanism past zero position is prevented by the trip-cams 61$^A$ on disks 60 which may have been partly advanced, being limited in their reverse movement by the inner shoulder of noses 62$^A$ of trip levers 62 shown in Fig. 15.

To hold gears 71 and associated parts in alinement when moved out of mesh with the gears on shaft 50 in zeroizing, plates 100 are provided on the shaft 101 to engage the teeth of gears 71 and hold same in alinement when moved out of mesh with the gears 52.

There being no carry to hold up in the units order, the rear extension of the key locking bar 15 having the lug 15$^D$ as in the higher orders, is omitted as shown in Fig. 6.

A modified form of my invention is shown in Fig. 21 wherein the numbered tablets are formed integral with the rear ends of the selector plates 22 which have upwardly extending arms 22$^c$ bent at their upper ends at right angles to form tablets arranged in vertical alinement one above the other and numbered from 0 to 9, the 0 tablet being the lowest one of the tier.

The operation of the selector plates is the same as previously described with the exception that the tablets are integral with the selector plates instead of on the oscillating levers 24, and as before stated, one of the bank of selector plates is always in its forward position to expose its number at the sight and to control the setting up of the abutments on each of the selector plates.

I claim:

1. In a machine of the class described, the combination of a set of keys, a tablet for each key, a group of tablet-operating members, and permutating means associated with the keys and said members whereby successive operation of keys will register the sum of their values.

2. In a machine of the class described, the combination of a set of keys, a tablet for each key, a group of tablet-operating plates each carrying settable abutments, means for setting abutments of one plate by operating of a different plate, and key-operated members common to abutments of such plates.

3. In a machine of the class described, the combination of a set of keys, a tablet for each key, a group of tablet levers, movable plates coupled to said levers respectively and each carrying settable abutments, means for setting abutments of one plate by operation of a different plate, and key-operated members common to abutments of such plates.

4. In a machine of the class described, the combination of a set of keys, a tablet for each key, a group of tablet-operating plates each carrying settable abutments, means for setting abutments of one plate by operation of a different plate, and key-operated pawls common to abutments of such plates.

5. In a machine of the class described, the combination of a set of keys, a tablet for each key, a group of tablet-operating plates each carrying settable abutments, bell-cranks coupled to the abutments and to the plates and grouped for the setting of abutments on other plates by the movement of an individual plate, and key-operated members common to the group of plates.

6. In a machine of the class described, the combination of a set of keys, a tablet for each key, a group of tablet-operating plates each carrying settable abutments, nested bell crank yokes coupled to the abutments and to the plates and variously offset and grouped for the setting of abutments on other plates by the movement of individual plates, and key-operated members common to the group of plates.

7. In a machine of the class described, the combination of sets of keys, a tablet for each key of each set; a group of tablet-operating members for each set of keys, and permutating means associated with the keys of each set and the associated tablet-operating members whereby successive operation of keys will register the sum of their values; together with means for effecting the carrying of tens by operation of one or another of the tablet-operating members of the higher order group.

8. In a machine of the class described, the combination of sets of keys, a tablet for each key of each set, a group of tablet-operating plates for each set of keys, each plate carrying settable abutments, means for setting abutments of different plates of one group by operation of another plate of that group, key-operated means common to abutments of different plates, additional abutment-engaging means for a higher order group of plates, and means controlled by lower order keys for operating said latter means.

9. In a machine of the class described, the combination of sets of keys, a tablet for each key of each set, a group of tablet-operating plates for each set of keys, each plate carrying settable abutments, means for setting abutments of different plates of one group by operation of another plate of that group, key-operated means common to abutments of different plates, additional abutment-engaging means for a higher order group of plates, spring-motor means for operating said latter means, and winding and escapement devices operated by the lower order keys.

10. In a machine of the class described, the combination of sets of keys, a tablet for each key of each set, a group of tablet-operating members for each set of keys, permutating means associated with the keys of each set and the associated tablet-operating means whereby successive operation of keys will register the sum of their values, and means for collectively actuating tablet-operating means of the several groups to exhibit cipher-tablets.

11. In a machine of the class described, the combination of sets of keys, a tablet for each key of each set, a group of tablet-operating members of each set of keys, permutating means associated with the keys of each set and an associated tablet-operating means whereby a successive operation of keys will register the sum of their values, spring-motor carrying means wound by lower order key connections and adapted to actuate tablet-operating members of higher orders, escapement devices controlling said means and controlled by the key connections, and means for collectively actuating tablet-operating members of the several groups to exhibit cipher tablets, together with provisions for releasing the spring-motor means.

JOHN BRICKEN.

Witnesses:
  R. A. MELEIT,
  J. A. BROPHY.